J. H. MONCE.
Street Car Awning.

No. 105,829. Patented July 26, 1870.

Witnesses.
Chas. H. Poole
J. B. Woodruff

Inventor.
Jas. H. Monce

United States Patent Office.

JAMES H. MONCE, OF NEW YORK, N. Y.

Letters Patent No. 105,829, dated July 26, 1870.

IMPROVEMENT IN AWNINGS FOR CARS, &c.

The Schedule referred to in these Letters Patent and making part of the same.

To all whom it may concern:

Be it known that I, JAMES H. MONCE, of New York city, in the county of New York and State of New York, have invented certain new and useful Improvements in Awnings for Street Horse-Cars, for protecting the animals from the rays of the sun, and also them and the driver from the storms, &c; and the following is a full, clear, and exact description of the same, reference being had to the accompanying drawing making a part of this specification, in which—

Figure 1:
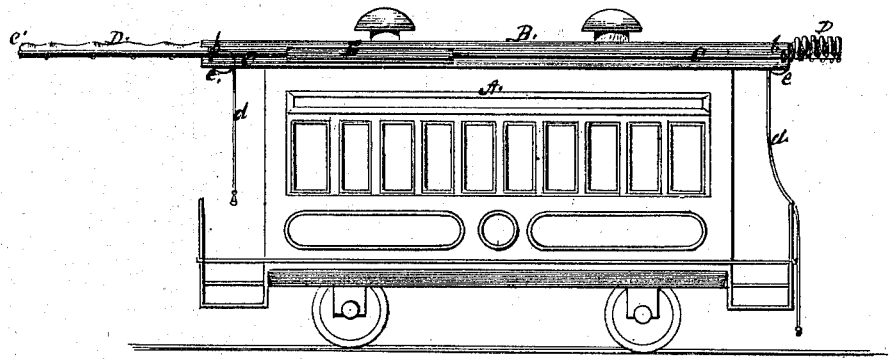
Figure 1 represents a side view of a street horse-car with the awning attached.
Figure 2:
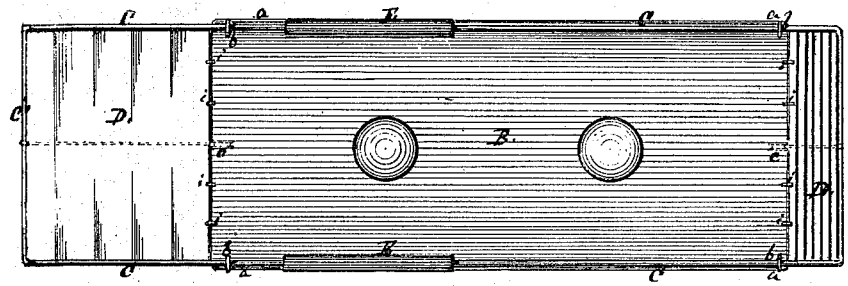
Figure 2 shows a plan or top view of the car with the awning attached.

The object of my invention is to protect horses or other animals when attached to street-cars and other vehicles from the excessive rays of the sun in the hot season, and from rain, sleet, and snow in winter.

My invention consists of simply constructing a frame of poles or rods of metal, so arranged as to be secured to the top of a street-car, express, or other covered wagon, carriage, or top vehicle, in such a manner that it can be covered with canvas or material impervious to water, and so attached with staples, loops, rings, or thimbles, that it will allow the rods of the frame to slide on the edges of the top so as to gather up and compress the covering into a small compass; and also, in the means provided for shifting the frame, so as to spread an awning at either end of a horse-car;—and the method of coupling the frame-rods so that the frame can be elongated at pleasure, and shortened up to bring both the awnings closely packed against the top or covering of a car or any other topped vehicle to which it is applicable, at such times as not necessary to be spread to ward off the sun or storms.

To enable others to make and use my invention I will describe it more in detail, referring to the drawing and to the letters of reference marked thereon.

All of the figures in the drawing represent and pertain to a street horse-car; but my invention is designed to embrace all vehicles drawn by horses, to which it can be attached.

A represents the body of any car or carriage which has a substantial top, B.

At the top corners, a a, either on the outside or in, are secured, by loops, rings, or staples, b b, sliding rods, of wood or metal, C C, which may be connected at their outer ends to form a frame, C', for supporting a covering of canvas, D, oil or rubber-cloth, which is provided with loops or rings to secure it to the rods C C in such a manner that it can be gathered or reefed up against the end of the top B, or spread out to its fullest capacity by the action of a small cord, d, secured to the frame C', and passing over a sheave or pulley, e, secured under the top B in a convenient place.

When applied to horse-cars on which the horses are changed at each end of the route, it is necessary to have an awning at both ends, so arranged and connected together that one can be opened or spread out at the same time the other is closed, or both be reefed.

To effect this the two frames may be connected together by any convenient kind of coupling-boxes, E E, or sockets, into which the rods C C are fitted, so that, by reefing one of the awnings D, the other will be spread out.

This is easily effected by the driver pulling on the cord d, which is within his reach, as he stops at the terminus of his route.

Figure 3:
Figure 3 represents an enlarged view, in section, of the frame or extension-rods having right and left screw-threads and buckle-joint for coupling together and elongating the frame.
Figure 4:
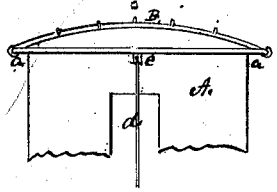
Figure 4 shows an end view of the top of a car, the lower portion broken off, showing the cord for shifting the awning.

The frame-rods C C may be provided with right and left screw-threads, $ff'$, and a long tube, F, forming a buckle-joint coupling to secure the frames together, so that the frames can be contracted or elongated, as may be desired, (see fig. 3).

It will readily be seen that an awning for the protection of horses working in harness, for the purposes as above described, can be constructed cheaply, and easily applied to any topped or covered vehicle, and will not be in the way of anything when reefed or closed up, is readily spread out when required, and will be a great relief to the animals as well as to their drivers under the scorching rays of the summer's sun, and also when they are obliged to be worked in severe storms of rain, sleet, and snow.

The edge of the awning D may be secured to the top B by spring snaps or hooks, i i i, so that the awning and frame can be easily taken off and laid up at seasons when not required, and it can be replaced at any time in a few minutes and ready for use, the loops or staples for the slides or rods C C remaining in their place.

What I claim as my improvement in awnings for railroad cars or other vehicles is—

So arranging the awning D D upon either end of the vehicle A, that it may be changed to serve as a protection on either end for the horse or the driver, in the manner shown and described.

JAS. H. MONCE.

Witnesses:
   J. B. WOODRUFF,
   EDM. F. BROWN.